(12) United States Patent
Thomas et al.

(10) Patent No.: US 6,424,720 B1
(45) Date of Patent: Jul. 23, 2002

(54) METHOD AND DEVICE FOR REDUCING MULTI-CHANNEL ACOUSTIC ECHO AND ADAPTING SOUND TO SPACE CONDITIONS

(75) Inventors: Jean-Philippe Thomas, Trezeny; Alain Saliou, Lannion; Marc Emerit, Guingamp; Yannick Mahieux, Bégard, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/424,406
(22) PCT Filed: May 20, 1998
(86) PCT No.: PCT/FR98/01010
§ 371 (c)(1),
(2), (4) Date: Nov. 22, 1999
(87) PCT Pub. No.: WO98/53595
PCT Pub. Date: Nov. 26, 1998

(30) Foreign Application Priority Data

May 21, 1997 (FR) .............................................. 97 06191

(51) Int. Cl.$^7$ ................................................ H03G 3/00
(52) U.S. Cl. ............................. 381/66; 381/83; 381/93; 379/406
(58) Field of Search ............................. 381/66, 83, 93, 381/71.11; 455/570; 379/406; 348/611; 370/286

(56) References Cited

U.S. PATENT DOCUMENTS 5,323,459 A * 6/1994 Hirano ......................... 381/66
5,661,813 A * 8/1997 Shimauchi et al. ........... 381/66
5,761,318 A * 6/1998 Shimauchi et al. ........... 381/66
5,901,230 A * 5/1999 Walker ......................... 381/66

FOREIGN PATENT DOCUMENTS

EP      0 709 999        5/1996

OTHER PUBLICATIONS

Oikawa et al., "Audio Teleconferencing Set with Multipath Echo Canceller," *Review of the Electrical Communications Laboratories*, vol. 36, No. 2, pp. 217–223 (1988).
PCT Search Report, dated Jul. 17, 1998, PCT Appl. No. PCT/Fr98/01010.

* cited by examiner

*Primary Examiner*—Forester W. Isen
*Assistant Examiner*—Laura A. Grier
(74) *Attorney, Agent, or Firm*—Marshall, Gerstein & Borun

(57) ABSTRACT

In order to reduce acoustic echo and restore stereophonic sound in a digital transmission system of sound signals on multiple transmission channels, between a local site and one or several remote sites, comprising several microphones and loudspeakers, the method consists in the following steps: computing a weighting factor to be applied to each microphone signal before emitting, based on two attenuation factors computed from the microphone and loudspeaker signals; transmitting on each transmission channel the linear combination of weighted microphone signals; computing a weighting factor to be applied to each loudspeaker signal; and emitting on the loudspeaker the linear combination of transmitted, weighted signals.

10 Claims, 3 Drawing Sheets

METHOD AND DEVICE FOR REDUCING MULTI-CHANNEL ACOUSTIC ECHO AND ADAPTING SOUND TO SPACE CONDITIONS

BACKGROUND OF THE INVENTION

The present invention relates to a method and a device for reducing multi-channel acoustic echo and restoring auditory perspective or "adapting sound to space". It finds a particularly important application in systems for digitally transmitting sound signals on several transmission channels between a local site and one or more remote sites, each site having several microphones and several loudspeakers. Such systems are referred to as "multi-channel" systems with regard to the sound take (the sound is picked up by several microphones), transmission (on several channels) and sound restoration (by means of several loudspeakers).

By way of example, although this is not restrictive, the invention will be described in an application involving video conference rooms, both on the basis of transmission between two rooms, in what is referred to as a "point to point" configuration (where the image from the remote room is displayed on a screen or several viewpoints of the remote room are displayed on several screens) and with regard to transmission within a network comprising more than two rooms in what is referred to as a "multi-point" configuration (where the images of the remote rooms are displayed on several screens).

In a room having N microphones and M loudspeakers, there are N×M acoustic echo paths. On the one hand, conventional systems for eliminating acoustic echo do not allow echo to be controlled at a reasonable cost in such a context. On the other, connecting each microphone in a local room to a loudspeaker of a remote room for transmission purposes in order to obtain the best possible distribution of the sound would multiply the number of transmission channels, making the transmission cost prohibitive in terms of commercial development.

Apart from the conventional systems for eliminating acoustic echo, systems for reducing acoustic echo are known, based on variations in the level of the sound signals. A major disadvantage generally encountered in such systems is the constraint placed on interactivity, i.e. a reduction in reception quality, in particular a considerable variation in sound level on reception in what are referred to as "double speech" situations, i.e. where, in a given local room, there is an effective local sound signal present simultaneously with an effective sound signal from the remote room.

SUMMARY OF THE INVENTION

The objective of the present invention is to provide a method and a device for reducing multi-channel acoustic echo and adapting sound to space, which will allow the echo to be reduced whilst maintaining interactivity and which, although using a relatively small number of transmission channels, will guarantee restoration of the auditory perspective. In its application to video-conferencing, the present invention will enable the remote meeting to be conducted as a natural communication situation.

To this end, the invention specifically proposes a method of reducing acoustic echo and adapting sound to space in a system for digitally transmitting sound signals on P transmission channels between a local site and at least one remote site, each having N microphones and M loudspeakers, N, M, P being integers, it being possible for the values of N and M to differ depending on the sites, whereby :

(a) a cumulative distribution function is computed for each microphone signal $x_i(n)$ from the local site, i being an integer ranging between 1 and N and n denoting the time rank of the samples, and a cumulative distribution function is computed for each loudspeaker signal $z_j(n)$ from the local site, j being an integer ranging between 1 and M (the concept of cumulative distribution function will be defined below); then, for every i, $1 \leq i \leq N$, (b) a first attenuation factor $G_{mic}(i,n)$ is computed for the microphone signal $x_i(n)$ from the local site on the basis of a ratio between the cumulative distribution functions obtained previously;

(c) the first attenuation factor $G_{mic}(i,n)$ is adjusted so as to obtain a second attenuation factor $G'_{mic}(i,n)$ defined as follows:

$$G'_{mic}(i,n)=S_1(G_{mic}(i,n))$$

where $S_1(G_{mic}(i,n))=s$ if $G_{mic}(i,n) \leq s$,
$S_1(G_{mic}(i,n))=G_{mic}(i,n)$ if $s<G_{mic}(i,n)<1$ and
$S_1(G_{mic}(i,n))=1$ if $G_{mic}(i,n) \geq 1$,
s being a predetermined minimum threshold which is strictly less than 1;

(d) on the basis of the cumulative distribution functions of microphone and loudspeaker signals computed previously, it is determined whether the microphone signal $x_i(n)$ is an echo signal only or a signal coming solely from the local site in the case of a first situation or if the microphone signal $x_i(n)$ contains components from the local site and other components from the remote site in the case of a second situation;

(e) a third attenuation factor $G''_{mic}(i,n)$ is computed which, in the first situation, is equal to the second attenuation factor $G'_{mic}(i,n)$ and in said second situation is equal to the second attenuation factor $G'_{mic}(i,n)$ but in which the minimum threshold s in the computation used to obtain it is increased by a predetermined value;

(f) a fourth attenuation factor $\Gamma(i,n)$ is computed on the basis of a ratio between the cumulative distribution functions of microphone signals;

(g) the fourth attenuation factor $\Gamma(i,n)$ is adjusted in order to obtain a fifth attenuation factor $\Gamma'(i,n)$ defined as follows:

$$\Gamma'(i,n)=S_2(\Gamma(i,n))$$

where $S_2(\Gamma(i,n))=s'$ if $\Gamma(i,n) \leq s'$,
$S_2(\Gamma(i,n))=\Gamma(i,n)$ if $s'<\Gamma(i,n)<1$ and
$S_2(\Gamma(i,n))=1$ if $\Gamma(i,n) \geq 1$,
s' being a predetermined minimum threshold strictly less than 1;

(h) the product of the third and fifth attenuation factors $G''_{mic}(i,n)$ and $\Gamma'(i,n)$ obtained previously is computed so as to obtain a global attenuation factor $G^*_{mic}(i,n)$ defined by:

$$G^*_{mic}(i,n)=G''_{mic}(i,n) \cdot \Gamma'(i,n)$$

(i) the global attenuation factor $G^*_{mic}(i,n)$ is adjusted so as to obtain a weighting factor $\beta_i(n)$ defined as follows:

$$\beta_i(n)=S_4(G^*_{mic}(i,n))$$

where $S_4(G^*_{mic}(i,n))=s''$ if $G^*_{mic}(i,n) \leq s''$ and
$S_4(G^*_{mic}(i,n))=G^*_{mic}(i,n)$ if $s''<G^*_{mic}(i,n) \leq 1$,
s" being a predetermined minimum threshold strictly less than 1;

(j) a signal $y_k(n)$ is transmitted on each transmission channel, k being an integer between 1 and P, in the form of a linear combination of the weighted microphone signals $x_i(n)$, defined as follows:

$$y_k(n) = \sum_{i=1}^{N} \alpha_{k,i}(n) \cdot \beta_i(n) \cdot x_i(n)$$

where $\alpha_{k,i}(n)$ denotes the predetermined real coding coefficients and $\beta_i(n)$ denotes the weighting factors obtained previously; then, for every integer j, $1 \leq j \leq M$:

(k) a sixth attenuation factor $G_{HP}(j,n)$ is computed for the loudspeaker signal $z_j(n)$ from the remote site on the basis of cumulative distribution functions calculated for each transmitted signal $y_k(n)$ from the local site;

(l) the sixth attenuation factor $G_{HP}(j,n)$ is adjusted so as to obtain a weighting factor $\lambda_j(n)$ defined as follows:

$$\lambda_j(n) = S_3(G_{HP}(j,n))$$

where $S_3(G_{HP}(j,f)) = *$ if $G_{HP}(j,n) \leq s^*$,
$S_3(G_{HP}(j,n)) = (G_{HP}(j,n))$ if $s^* < G_{HP}(j,n) < 1$ and
$S_3(G_{HP}(j,n)) = 1$ if $G_{HP}(j,n) \geq 1$,
$s^*$ being a predetermined minimum threshold strictly less than 1;

(m) the loudspeaker signal $z_j(n)$ of the remote site is determined on the basis of a linear combination of the weighted transmitted signals $y_k(n)$, defined as follows:

$$z_j(n) = \lambda_j(n) \cdot \sum_{k=1}^{P} \gamma_{j,k}(n) \cdot y_k(n)$$

where $\lambda_{j,k}(n)$ denotes the predetermined real decoding coefficients and where $\lambda_j(n)$ denotes the weighting factors obtained previously; and (n) the loudspeaker signal $z_j(n)$ thus obtained is emitted on the j-$^{th}$ loudspeaker of the remote site.

The operations outlined above are performed in a similar manner in all the rooms of the network in question, both on transmission and on reception. Throughout this text, in order to simplify the description, we will look at a given room which will be referred to as the "local" room and one or several "remote" rooms and only the operations performed in the local room on transmission and the operations performed in the remote room(s) on reception will be described, although similar operations are also performed in the remote room(s) on transmission and in the local room on reception respectively.

For the same purpose described above, the present invention also proposes a device for reducing acoustic echo and adaptation to space in a system for digitally transmitting sound signals on P transmission channels between a local site and at least one remote site, each Ad having N microphones and M loudspeakers, N, M and P being integers, it being possible for the values of N and M to differ depending on the sites, characterised in that it comprises:

a module for encoding sound signals, receiving at its input N digital signals $x_i(n)$ respectively originating from the N microphones of the local site, where i is an integer between 1 and N and n is an integer which denotes the time rank of the samples, this encoding module supplying at its output P digital signals $y_k(n)$, where k is an integer ranging between 1 and P, defined by the following formula:

$$y_k(n) = \sum_{i=1}^{N} \alpha_{k,i} \cdot \beta_i(n) \cdot x_i(n)$$

where $\alpha_{k,1}(n)$ denotes the predetermined real coding coefficients and
where $\beta_i(n)$ denotes the weighting factors which depend on cumulative distribution functions of the signals received by the microphones of the local site and cumulative distribution functions of the signals transmitted by the loudspeakers of the local site, the P signals $y_k(n)$ being transmitted respectively on the P transmission channels between the local site and the remote site; and a module for decoding the sound signals, receiving at its input the P signals $y_k(n)$ and supplying M digital signals $z_j(n)$ at its output to be emitted respectively by the M loudspeakers of each site, where j is an integer between 1 and M, defined by the following formula:

$$z_j(n) = \lambda_j(n) \cdot \sum_{k=1}^{P} \gamma_{j,k}(n) \cdot y_k(n)$$

where $\gamma_{j,k}(n)$ denotes the predetermined real decoding coefficients and where $\lambda_j(n)$ denotes the weighting factors which depend on the signals $y_k(n)$.

Other features and advantages of the invention will become clear from the detailed description of specific embodiments which are given below by way of example but are not restrictive in any respect.

BRIEF DESCRIPTION OF DRAWINGS

The description is given with reference to the appended drawings, in which.

DETAILED DESCRIPTION OF THE INVENTION

The present invention will be described here as applied to a network having at least two video-conference rooms. Although not restrictive, this application provides an example of a digital system for transmitting sound signals between a local site and one or more remote sites, each having several microphones and several loudspeakers. The sound signals considered here are generally speech signals.

For the purposes of this description, it will be assumed that in a given room, whether it be a local or a remote room, the microphones and the loudspeakers are chosen so that the coupling between loudspeakers and microphones is negative. This means that the maximum value, in dB, of the transfer function between the input of the amplifiers of the loudspeakers and the output of the pre-amplifiers to which the microphones are connected is negative. The energy of a signal from the pre-amplifier of a microphone and coming from a loudspeaker of the same room is therefore lower than the energy of the signal at the input of the amplifier of this loudspeaker. The negative coupling guarantees the stability of the acoustic loop; in particular, there will be no Larsen effect. On the other hand, this will make it possible to differentiate between the echo and the effective remote speech since the mean level of the echo is always lower than the mean level of the effective remote speech. The hypothesis of negative coupling is verified in most conventional video-conference rooms.

The terms "microphone signal at a given instant" will be used to denote all the sound signals picked up by a microphone at this instant. The terms "loudspeaker signal at a given instant" will be used to denote the sound signal emitted by a loudspeaker at this instant.

Figure 1:
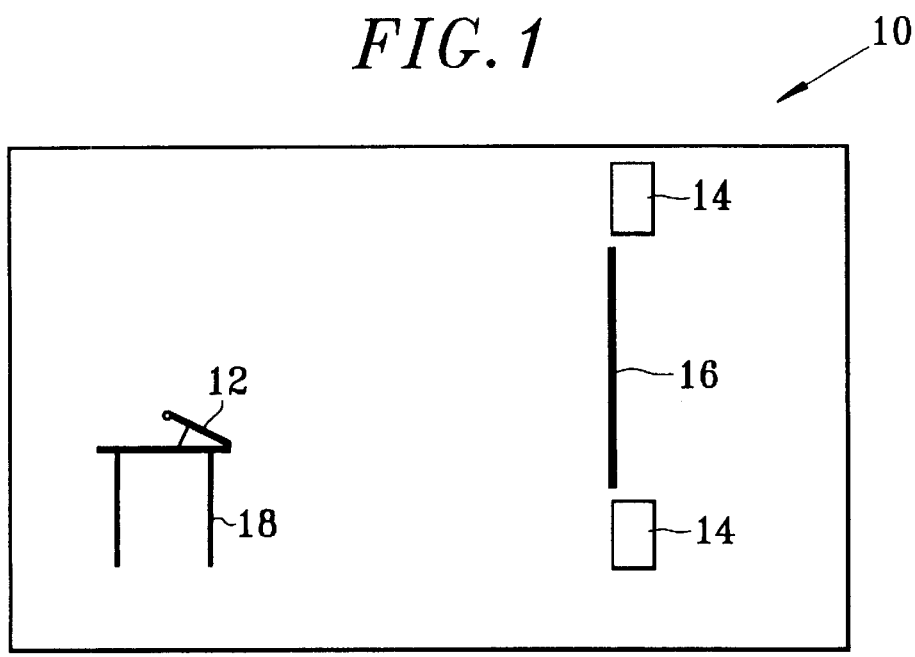
FIG. 1 is a simplified, schematic diagram of a conventional video-conference room of the type having several microphones and several loudspeakers, the layout of the main elements being given by way of a non-restrictive example.

Turning to FIG. 1, it should be pointed out that a conventional video-conference room 10 of the conventional type having several microphones and several loudspeakers has several microphones 12 and several loudspeakers 14 and at least one screen 16, in addition to the usual furniture (generally a table(s) and chair (s)). To retain greater clarity, only one microphone 12, two loudspeakers 14, one screen 16 and one table 18 are illustrated.

For the purposes of this description, a local room will have N microphones and M loudspeakers, the integers N and M not necessarily being equal, and one or more remote rooms, depending on the application, will also have N microphones and M loudspeakers. The integers N and M may vary from one room in the network to another.

The video-conference rooms considered generally have no more than 12 microphones and 16 loudspeakers.

A specific embodiment of the invention will firstly be described with reference to FIG. 2.

During a first step, statistical values referred to as cumulative distribution functions are computed on the signals of each microphone and loudspeaker of the local room. These values describe the distributions of microphone and loudspeaker signals. By way of example, although this is not restrictive, they can be estimated either in broadband or on certain frequency bands.

It should be pointed out that the cumulative distribution functions are successive partial derivatives of the second characteristic function of a random vector, taken at the source. In particular, it can be shown that for two signals a and b, if a=b=x, then the cumulative distribution function of the second order of the signals a and b, referred to in this case as auto-cumulative distribution function of the second order of the signal x, represents the energy of the signal x and if a≠b, then the cumulative distribution function of the second order of the signals a and b, referred to in this case as the inter-cumulative distribution function of the second order of the signals a and b, represents the inter-correlation function of the signals a and b.

In one particular embodiment of the method proposed by the invention, the auto-cumulative distribution function of the second order is chosen as the cumulative distribution function for the microphone signals and the loudspeaker signals, i.e. the energy of these signals. The signal picked up by the $i^{th}$ microphone of a given room will be written $x_i(n)$, i being an integer between 1 and N and n denoting the time rank of the samples. The signal emitted by the $j^{th}$ loudspeaker of a given room will be written $z_j(n)$, j being an integer between 1 and M. The respective energies of the microphone and loudspeaker signals will be written $Cum_2(x_i(n))$ and $Cum_2(z_j(n))$.

Figure 2:
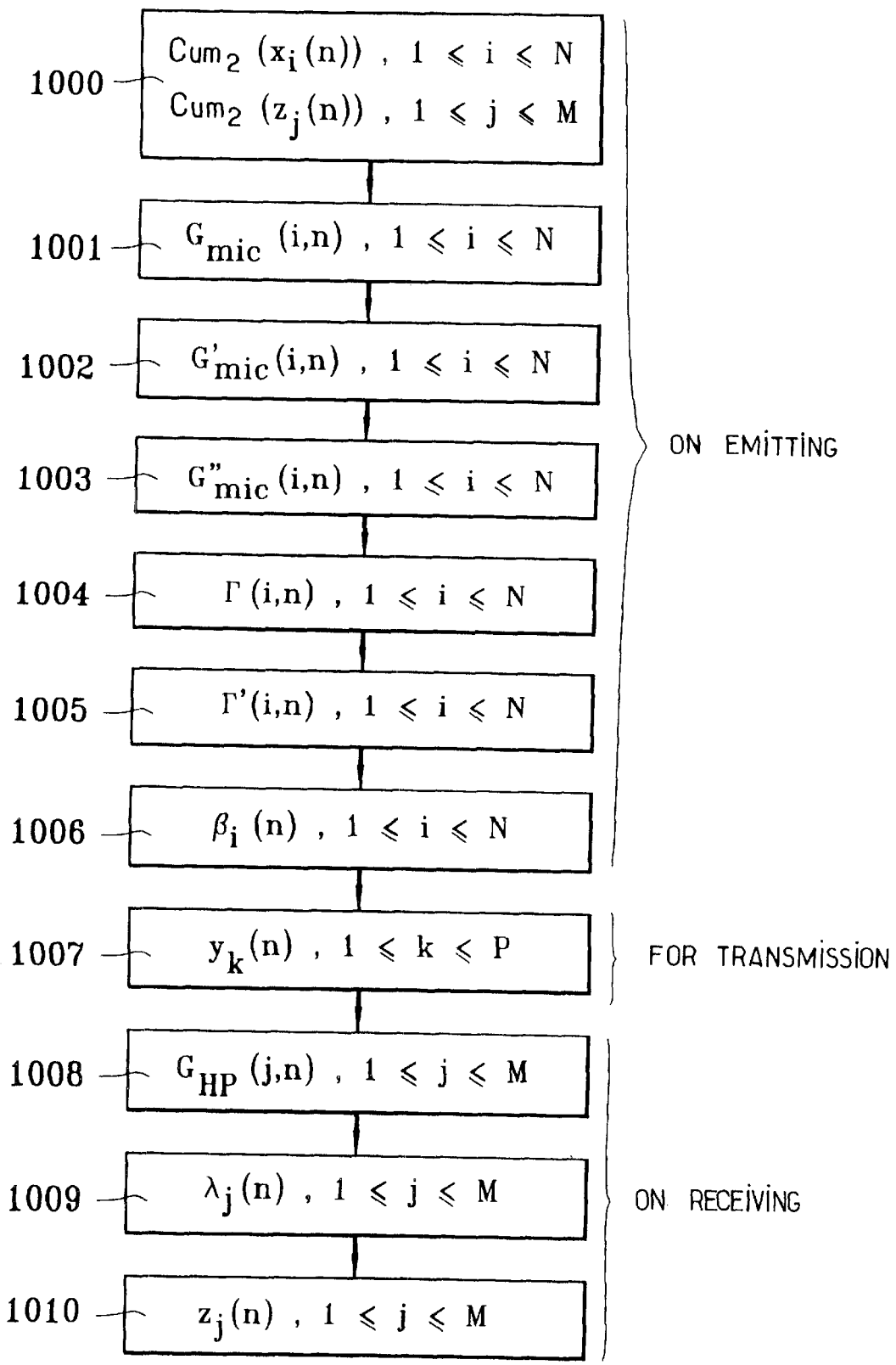
FIG. 2 is a general flow chart showing the method proposed by the present invention in a specific mode of implementation.

This first step is denoted by the reference numeral 1000 in FIG. 2.

In another embodiment, not described here, the inter-cumulative distribution functions of the second order may be chosen as the cumulative distribution functions, i.e. inter-correlation functions of the microphone and loudspeaker signals.

Then, as indicated at 1001 in FIG. 2, these statistical values are used to compute, for each microphone signal of the local room, a first attenuation factor $G_{mic}(i,n)$ enabling the echo to be reduced as a function of the loudspeaker signals of the local room.

In the specific embodiment mentioned above where the chosen cumulative distribution functions are the energies, the first attenuation factor $G_{mic}(i,n)$ is computed on the basis of the following formula:

$$G_{mic}(i, n) = \frac{Cum_2(x_i(n))}{C \cdot \sum_{j=1}^{M} Cum_2(z_j(n))} \quad (1)$$

where C is a real constant strictly greater than 1. In the presence of loudspeaker signals, this constant allows the microphone signals to be attenuated more rapidly, which enables the echo to be reduced more rapidly. The choice of C is linked in particular to the acoustic characteristics of the room and the transducers used. By way of example although not restrictive and in a specific acoustic context, it may be that C=8.

The cumulative distribution functions as well as the first attenuation factor $G_{mic}(i,n)$ may be computed either with each sample or at a rate which is less than the sampling frequency, or by frame of several samples, although these examples are not exhaustive. In this latter case, a mean value of the cumulative distribution functions and the first attenuation factor may be computed on a given frame, for example, and this mean value assigned to each sample of this frame.

However, the first attenuation factor $G_{mic}(i,n)$ in this case is not applied in its present state to the corresponding microphone signal $x_i(n)$.

In order to avoid a saturation of microphone signals, the first attenuation factor $G_{mic}(i,n)$ is adjusted so that it has a maximum value equal to 1 and its minimum value is the desired attenuation, which will depend on the level of the acoustic echo.

As indicated at 1002 in FIG. 2, an adjusted attenuation factor referred to as the second attenuation factor is obtained for each microphone signal of the local room, which is written $G'_{mic}(i,n)$ and defined by:

$$G'_{mic}(i,n) = S_1(G_{mic}(i,n)) \quad (2)$$

where $S_1(G_{mic}(i,n)) = s$ if $G_{mic}(i,n) \leq s$,
$S_1(G_{mic}(i,n)) = G_{mic}(i,n)$ if $s < G_{mic}(i,n) < 1$ and
$S_1(G_{mic}(i,n)) = 1$ if $G_{mic}(i,n) \geq 1$.

The minimum threshold s is the above-mentioned desired attenuation. In the above-mentioned example where C=8, for a transfer function between loudspeakers and microphones having a mean value of −20 dB on the entire frequency domain used, an advantageous minimum threshold is s=0.1, which corresponds, in dB, to $20 \log_{10} s = -20$ dB, where logic denotes the decimal logarithm.

However, the second attenuation factor $G'_{mic}(i,n)$ is not applied in its present state to the corresponding microphone signal $x_i(n)$ in this case either. Otherwise, in the event of double speech, i.e. in the presence of simultaneous local and remote speech, the signal of the local speech would be subjected to the same attenuation factor as the echo, which would limit inter-activity. For this reason, an additional adjustment is made to the attenuation factors to be applied to the microphone signals.

On the basis of the ratio of cumulative distribution functions (1) computed previously, it is ascertained, microphone by microphone, for every integer i ranging between 1 and N, whether the microphone signal $x_i(n)$ is an echo signal only or a signal of local speech only in a first situation or, in a second situation, whether $x_i(n)$ is a double speech signal.

In one particular mode of implementation, if the first attenuation factor $G_{mic}(i,n)$ has a value very much lower than 1, this means that it is a single echo signal since it was assumed that the coupling between loudspeakers and microphones is negative. If $G_{mic}(i,n)$ is very much greater than 1, then the signal is a signal carrying local speech only. If $G_{mic}(i,n)$ has an intermediate value, the signal is a double speech signal.

This process of determining the type of each microphone signal may be performed using any other method deemed appropriate.

Having determined the type of each microphone signal $x_i(n)$, a third attenuation factor $G''_{mic}(i,n)$ is computed accordingly, as indicated at 1003 in FIG. 2, based on the second attenuation factor $G'_{mic}(i,n)$, as follows. In the first of the above-mentioned cases, where the microphone signal $x_i(n)$ is a single echo signal or a local speech signal only, the third attenuation factor is $G''_{mic}(i,n)=G'_{mic}(i,n)$. In the second of the above-mentioned cases, where the microphone signal $x_i(n)$ is a double speech signal, the attenuation factor is "relaxed", i.e. in calculating the second attenuation factor $G'_{mic}(i,n)$, the initial value of the minimum threshold s is replaced by a higher value in a proportion such that the echo is perceptible but not problematic. In the above-mentioned example where C=8 and s=0.1, one might choose to increase the threshold s if the ratio of cumulative distribution functions (1) is greater than −12 dB, for example; one might choose to set it at s=0.7, i.e. approximately −3 dB. This relaxation of the attenuation factor, applied solely in the case of microphones which pick up a local speech signal, helps to preserve inter-activity in particular.

The steps described above relate to operations performed separately for each microphone of the local room. In order to take account of the presence of other microphones in the local room in each of these operations, an additional attenuation factor is computed for each microphone signal $x_i(n)$, referred to as the fourth attenuation factor and written $\Gamma(i,n)$, as indicated at 1004 in FIG. 2.

The fourth attenuation factor $\Gamma(i,n)$ takes account of microphone signals $x_q(n)$ where q is a different integer from i and ranges between 1 and N. It is computed on the basis of a ratio between the cumulative distribution functions of microphone signals. In one particular embodiment, the auto-cumulative distribution function of the second order is chosen as the cumulative distribution function for the microphone signals $x_i(n)$, i.e. the energy of these signals, and the fourth attenuation factor $\Gamma(i,n)$ is computed for each microphone signal $x_i(n)$ on the basis of the following formula:

$$\Gamma(i,n) = \frac{(Cum_2(x_i(n)))^{N-1}}{\prod_{\substack{q=1 \\ q \neq i}}^{N} Cum_2(x_q(n))} \quad (3)$$

As mentioned above, the auto-cumulative distribution functions of the microphone signals can be estimated on the one hand either in broadband or on certain frequency bands and, on the other, either with each sampling or by frame of several samples.

In the ratio of cumulative distribution functions (3), it is of particular advantage to use as the denominator the product of the cumulative distribution functions of the microphone signals other than the $i$-$th$ microphone signal. As a variant, the sum of the same cumulative distribution functions may nevertheless also be used.

However, the fourth attenuation factor $\Gamma(i,n)$ is not applied in its present state to the corresponding microphone signal $x_i(n)$.

In order to avoid a saturation of microphone signals, the fourth attenuation factor $\Gamma(i,n)$ is adjusted by performing a step similar to the step at which the first attenuation factor $G_{mic}(i,n)$ was adjusted, as described above.

As indicated at 1005 on FIG. 2, a fifth attenuation factor $\Gamma'(i,n)$ is therefore obtained for each microphone signal of the local room, defined by:

$$\Gamma'(i,n)=S_2(\Gamma(i,n)) \quad (4)$$

where $S_2(\Gamma(i,n))=s'$ if $\Gamma(i,n) \leq s'$,
$S_2(\Gamma(i,n))=\Gamma(i,n)$ if $s' < \Gamma(i,n) < 1$ and
$S_2(\Gamma(i,n))=1$ if $\Gamma(i,n) \geq 1$.

The minimum threshold is the desired threshold, which will mainly depend on the level of perceptible crosstalk and, to a lesser extent, the echo level. The crosstalk in this case is characterised by the perceptible interference in the microphone signal $x_i(n)$ between the speech coming from the speaker talking in front of the $i$-$th$ microphone of the local room and the speech from the speakers talking in front of the other microphones of the local room and which is also picked up by the $i$-$th$ microphone.

In the example mentioned above where C=8 and s=0.1 (or s=0.7 in the case of double speech), an advantageous threshold s' is s'=0.125, i.e. approximately −18 dB.

The product of the third and fifth attenuation factors $G''_{mic}(i,n)$ and $\Gamma'(i,n)$ obtained previously is then computed so as to obtain a global attenuation $G^*_{mic}(i,n)$ for each microphone signal $x_i(n)$, defined by:

$G^*mic\ (i,n) = G''^{mic}(i,n) \cdot \Gamma'(i,n)$.

This global attenuation factor is then adjusted in order to obtain for each microphone signal $x_i(n)$, as indicated at 1006 in FIG. 2, a weighting factor $\beta_i(n)$ defined as follows:

$$\beta_i(n)=S_4(G^*_{mic}(i,n)) \quad (5)$$

where $S_4(G^*_{mic}(i,n))=s''$ if $G^*_{mic}(i,n) \leq s''$ and
$S_4(G^*_{mic}(i,n))=G^*_{mic}(i,n)$ if $s'' < G^*_{mic}(i,n) \leq 1$,
s" being a predetermined minimum threshold strictly less than 1.

In the above-mentioned example where C=8, s=0.1 (or s=0.7 in the case of double speech) and s'=0.125, an advantageous threshold s" is s"=0.1.

The corresponding weighting factor $\beta_i(n)$ is applied to each microphone signal $x_i(n)$.

As a variant to steps 1005 and 1006, it is also possible to calculate firstly the attenuation factor $\Gamma'''(i,n)$ and then apply it to the corresponding microphone signal $x_i(n)$ in order to obtain an attenuated microphone signal; the attenuation factor $G''_{mic}(i,n)$ is then computed and applied to the attenuated microphone signal.

Let us assume that P channels are provided for digital transmission between the local room and the remote room or rooms.

In the specific embodiment described, the next step of the method proposed by the invention consists in transmitting a signal $y_k(n)$ on each transmission channel, k being an integer between 1 and P, as indicated at 1007 in FIG. 2, in the form of a linear combination of the weighted microphone signals $x_i(n)$, defined as follows:

$$y_k(n) = \sum_{i=1}^{N} \alpha_{k,i}(n) \cdot \beta_i(n) \cdot x_i(n) \quad (6)$$

where $\alpha_{k,i}(n)$ denotes the predetermined real coding coefficients and $\beta_i(n)$ denotes the weighting factors obtained previously.

The factors $\beta_i(n)$ vary over time and contribute in particular to reducing the echo whilst preserving the interactivity. They also make it possible to give priority to the active microphone(s) and to enhance adaptation of the sound to space.

The coefficients $\alpha_{k,i}(n)$, $1 \leq k \leq P$, $1 \leq i \leq N$, form a coding matrix with P rows and N columns. The coefficient located at the intersection of the $k_0$-th row and the $i_0$-th column, written $\alpha_{k0,i0}(n)$, where $k_0$ is an integer between 1 and P and $i_0$ is an integer between 1 and N, represent the contribution of the $i_0$-th microphone to the $k_0$-th transmission channel.

Accordingly, each row of the coding matrix supplies the contributions of the N microphones to a given transmission channel and each column supplies the contributions of a given microphone to the different transmission channels. The sum of the coefficients of each column is 1.

These contributions, i.e. the coefficients $\alpha_{k,i}(n)$, are less than or equal to 1 and are chosen by an appropriate method, depending on the acoustic and video context. The coefficients $\alpha_{k,i}(n)$ will depend in particular on the network configuration of the video-conference rooms. For example, they will differ depending on whether the configuration is of the point to point or multipoint type (these concepts were defined in the introduction). The coefficients $\alpha_{k,i}(n)$ will also depend on the camera shots taken in the video-conference rooms of the network, chosen to ensure that the sound signals and images supplied by the screens of the different rooms match.

Each microphone is generally assigned to a region of the local room. Each channel generally transmits the contributions of microphones close to a same region.

As an example, although this is not restrictive, in the case where N=6(six microphones) and P=2(two transmission channels), the following coding matrix may be chosen:

```
1  1  1/2  1/2  0  0
0  0  1/2  1/2  1  1
```

In this example, the choice made is one where the first and second microphones are assigned to a "left-hand" region, the second and third microphones to a "centre" region and the fifth and sixth microphones to a "right-hand" region, on the basis of where they are positioned in the room.

The signals from the first and second microphones are transmitted on the first channel ($\alpha_{1,1}=\alpha_{1,2}=1$). The signals from the fifth and sixth microphones are transmitted on the second channel ($\alpha_{2,5}=\alpha_{2,6}=1$). The signals from the third and fourth microphones are transmitted 50% on the first channel and 50% on the second channel ($\alpha_{1,3}=\alpha_{1,4}=\alpha_{2,3}=\alpha 2.4$ ½). The contributions of the fifth and sixth microphones to the first channel are regarded as negligible, given the essentially distant location of these microphones from the "left-hand" region ($(\alpha_{1,5}=\alpha_{1,6}=0)$. Similarly, the contributions of the first and second microphones to the second channel are regarded as negligible, given the essentially distant location of these microphones from the "left-hand" region ($\alpha_{2,1}=\alpha_{2,2}=0$).

The description below relates to reception in a given remote room.

The next step of the method consists in computing a sixth attenuation factor $G_{HP}(j,n)$ from cumulative distribution function for each signal $y_k(n)$ of this remote room, as indicated at 1008 of FIG. 2, transmitted from the local room considered above.

In one particular embodiment, the sixth attenuation factor $G_{HP}(j,n)$ is derived from a ratio between the auto-cumulative distribution functions of the second order (energies) and the inter-cumulative distribution functions of the second order (inter-correlation functions) of the transmitted signals $y_k(n)$. In the same way as for the cumulative distribution functions mentioned above, the computation may be performed by frequency band or in broadband.

As with the attenuation factors calculated for transmission, a minimum threshold is applied to the sixth attenuation factor $G_{HP}(j,n)$, written s* and strictly less than 1, and a maximum threshold of 1 so that this attenuation will have 1 as its maximum value and the desired attenuation, depending on crosstalk and echo, as its minimum value.

As indicated at 1009 in FIG. 2, a weighting factor $\lambda_j(n)$ is thus obtained, defined as follows:

$$\lambda_j(n) = S_3(G_{HP}(j,n)) \quad (7)$$

where $S_3(G_{HP}(j,n)) = s^*$ if $G_{HP}(j,n) \leq s^*$, $S_3(G_{HP}(j,n)) = (G_{HP}(j,n))$ if $s^* < G_{HP}(j,n) < 1$ and $S_3(G_{HP}(j,n)) = 1$ if $G_{HP}(j,n) \geq 1$.

As an example, although not restrictive, in the case where P=2(two transmission channels) and M=3 (three loudspeakers), the weighting factors may be obtained as follows:

$$G_{HP}(2,n) = \frac{2 \cdot Cum_2(y_1(n)) \cdot Cum_2(y_2(n))}{Cum_2(y_1(n))^2 + Cum_2(y_2(n))^2}$$

where $Cum_2(y_1(n))$ is an auto-cumulative distribution function of the second order which represents the energy of the transmitted signal $y_1(n)$, and where $Cum_2(y_2(n))$ is an auto-cumulative distribution function of the second order which represents the energy of the transmitted signal $y_2(n)$.

In the same example, a choice may be made so that $\lambda_1(n) = \lambda_3(n) = 1 + s^* - \lambda_2(n)$.

These expressions can easily be generally applied to a larger number of transmission channels and loudspeakers.

In the above-mentioned example where C=8, s=0.1 (or s=0.7 in the case of double speech) and s'=0.125, an advantageous threshold s* is s*=s'=0.125, i.e. approximately −18 dB.

As indicated at 1010 in FIG. 2, each loudspeaker signal $z_j(n)$ of the remote room is then determined on the basis of a linear combination of the weighted transmitted signals $y_k(n)$, defined as follows:

$$z_j(n) = \lambda_j(n) \cdot \sum_{k=1}^{P} \gamma_{j,k}(n) \cdot y_k(n) \qquad (8)$$

where $\gamma_{j,k}(n)$ denotes the predetermined real decoding coefficients and where $\lambda_j(n)$ denotes the weighting factors obtained previously.

The coefficients $\lambda_j(n)$ vary over time and contribute in particular to improving restoration of the auditory perspective and reducing any crosstalk, in particular when transmitting on a number of channels P lower than the number of loudspeakers M. They also help to reduce acoustic echo by limiting the number of active loudspeakers at any time.

The coefficients $\gamma_{j,k}(n)$, $1 \leq j \leq M$, $1 \leq k \leq P$, form a decoding matrix with P rows and M columns. They depend in particular on the layout of the loudspeakers and the display of the images in the video-conference rooms of the network. Unlike the coding coefficients $\alpha_{k,i}(n)$, the coefficients $\gamma_{j,k}(n)$ are not dependent on whether the network is of a point to point or multipoint configuration.

The next step in the method consists in emitting, by means of the j-$^{th}$ loudspeaker of the remote room, for every integer j ranging between 1 and M, the loudspeaker signal $z_j(n)$ obtained from formula (8).

In one particular embodiment, the products $\gamma_{j,k}(n) \cdot \lambda_j(n)$, $1 \leq j \leq M$, $1 \leq k \leq P$, are also transmitted on the P transmission channels at the same rate as the sound signals. Consequently, each transmission channel carries, in addition to the signal $y_k(n)$, the weightings which must be applied to this signal before it is emitted by the corresponding loudspeaker of the remote room. This is tantamount to detecting voice activity and transmitting the corresponding information.

In this embodiment, the coding matrix is adapted to suit the active speakers and the decoding matrix used on emission is based on the coding matrix and sound restoration characteristics.

If the number of active microphones, as derived from the value of the fifth attenuation factor $\Gamma'(i,n)$ or the third attenuation factor $G''_{mic}(i,n)$, is lower than or equal to the number of transmission channels, each signal emitted from an active microphone is switched to one of the channels. The coding matrix is then made up only of 1 and 0 (the 1 corresponding to the active microphones).

In this embodiment, the decoding matrix is the transposed version of the coding matrix.

The M×P coefficients $\gamma_{j,k}(n)$ can be transmitted by means of a low number of bits. For example, although this is not restrictive, three bits per coefficient should suffice. Coding may be of the logarithmic type, for example, where each coefficient, expressed in dB, is quantified in a uniform manner over a given number of levels. As an example, although this is not restrictive, there may be eight levels.

In one particular embodiment, the signals to be transmitted $y_k(n)$ are also broadcast in the local room by means of the local loudspeakers in addition to the signals received from the remote room(s) and at a lower level than the received signals. This scattering of a local return makes the speakers talk less loudly or farther away from the microphone if they were initially speaking too loudly or were too close to the microphone without realising it. This scattering also helps to create a common acoustic environment in a given room, which is of particular advantage for speakers located at different parts of a same room.

A particular embodiment of the device proposed by the invention will now be described with reference to FIG. 3.

This device is applied to a digital system for transmitting sound signals of the same type as that considered with regard to the method, namely a system using P transmission channels between a local room and at least one remote room, each of which has N microphones and M loudspeakers, it being possible for the values of N and M to differ from room to room.

Figure 3:
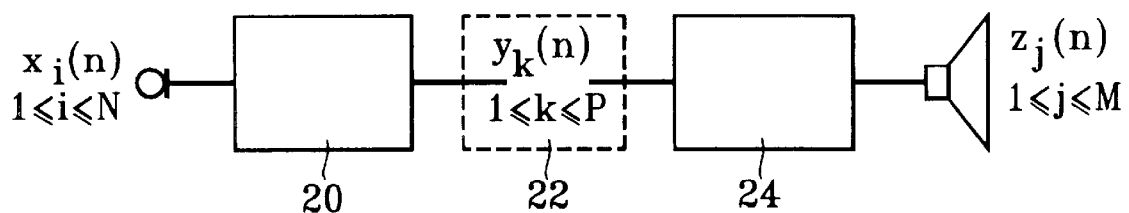
FIG. 3 is a diagram illustrating the device of the present invention, in one specific embodiment.

As illustrated in FIG. 3, the device has a module 20 for encoding the sound signals. The module 20 receives N digital signals $x_i(n)$ at its input, arriving respectively from the N microphones of the local room. At its output, it supplies P digital signals $y_k(n)$ defined by formula (6) above.

The P signals $y_k(n)$ are transmitted respectively on the P transmission channels in the network 22.

The device also has a module 24 for decoding the sound signals. At its input, the module 24 receives the P signals $y_k(n)$ and supplies at its output M digital signals $z_j(n)$, defined by formula (8) given above, to be emitted respectively by the M loudspeakers of each room.

Figure 4:
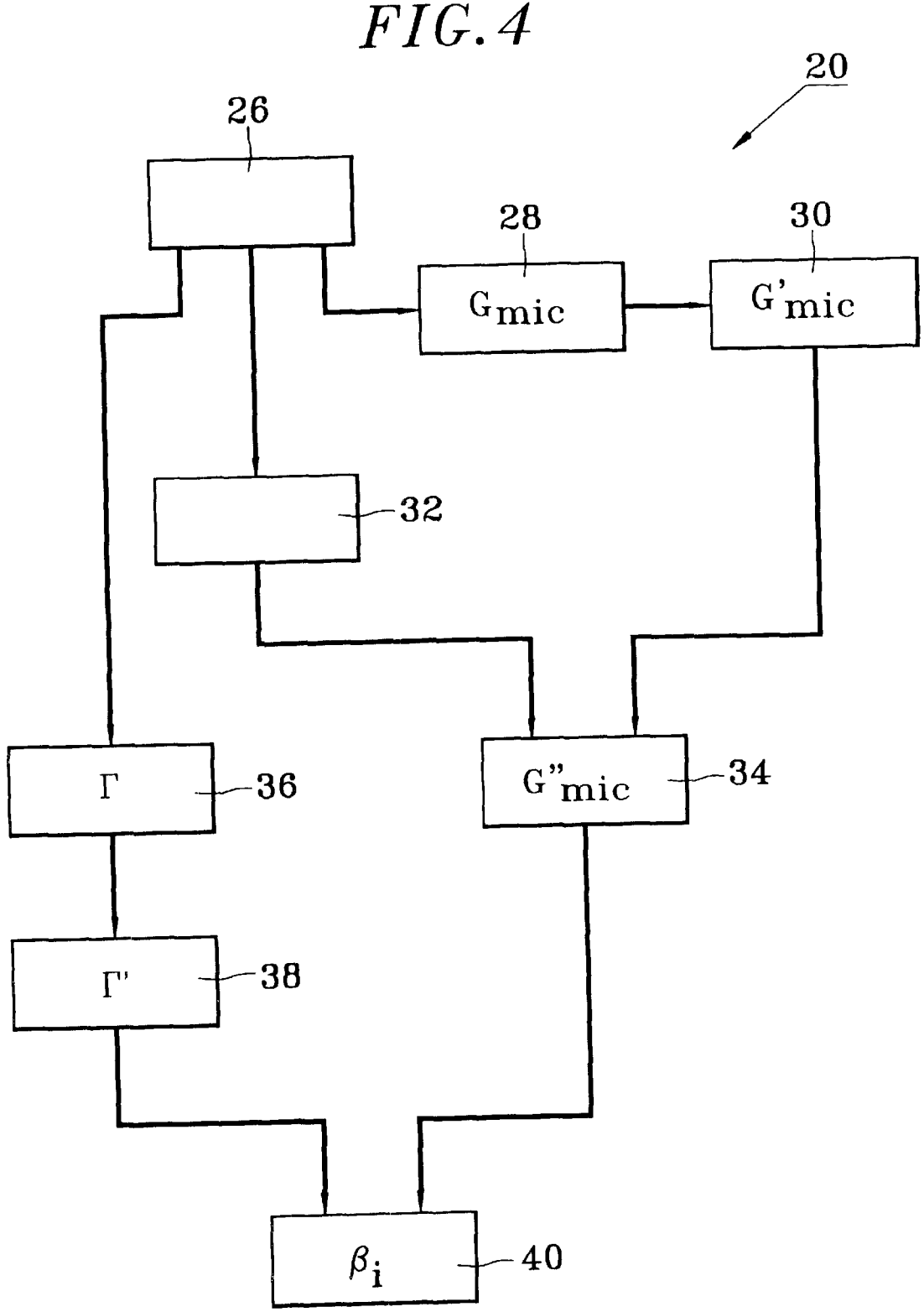
FIG. 4 is a diagram showing a coding module incorporated in the device proposed by the invention, shown in a specific embodiment.

In the specific embodiment illustrated in FIG. 4, the module 20 for coding the sound signals has a module 26 for computing a cumulative distribution function for each microphone signal $x_i(n)$ from the local room and a cumulative distribution function for each loudspeaker signal $z_j(n)$ from the local room.

The module 20 also has a module 28, connected to the output of the module 26, for computing the first attenuation factor $G_{mic}(i,n)$, described above, for each microphone signal $x_i(n)$ from the local room on the basis of a ratio between the cumulative distribution functions supplied by the module 26 which computes the cumulative distribution functions. In one specific embodiment, the module 28 supplies at its output the values of $G_{mic}(i,n)$ as defined by formula (1) given above.

A module 30 for modifying each first attenuation factor $G_{mic}(i,n)$ is connected to the output of the module 28. At its output, it supplies the second attenuation factor $G'_{mic}(i,n)$ defined by formula (2) given above.

The module 20 also has a module 32, connected to the output of the module 26 for computing the cumulative distribution functions, which for each microphone signal $x_i(n)$, determines, on the basis of the cumulative distribution functions of microphone and loudspeaker signals supplied by the module 26, whether this microphone signal is a single echo signal or a signal coming only from the local room, in a first situation, or whether this microphone signal has components from the local room and other components coming from the remote room, in a second situation, as described above.

A module 34 for computing the third attenuation factor $G''_{mic}(i,n)$ defined above is connected to the output of modules 30 and 32.

The module 20 also has a module 36 connected to the output of module 26 for computing cumulative distribution functions, in order to calculate the fourth attenuation factor $\Gamma(i,n)$ on the basis of a ratio between the cumulative distribution functions of microphone signals. In one particular embodiment, the module 36 supplies the values of $\Gamma(i,n)$ at its output, as defined in formula (3) above.

A module 38 for modifying each fourth attenuation factor $\Gamma(i,n)$ is connected to the output of module 36. At its output, it supplies the fifth attenuation factor $\Gamma'(i,n)$ defined by formula (4) above.

A module 40 for computing and adjusting the product of the third and fifth attenuation factors $G''_{mic}(i,n)$ and $\Gamma'(i,n)$ is connected to the output of the modules 34 and 38. At its output, the module 40 supplies the weighting factors $\square_i(n)$ defined by formula (5) above.

Figure 5:
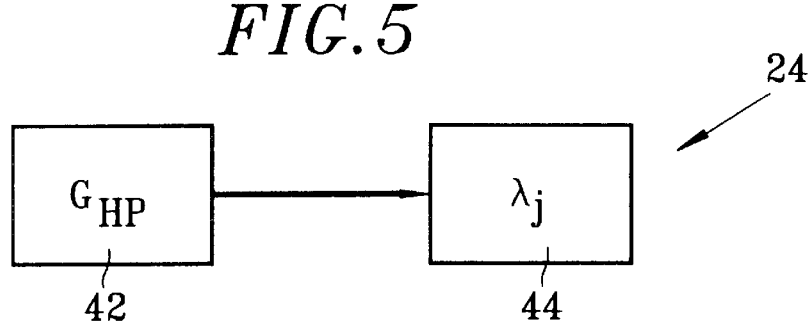
FIG. 5 is a schematic representation of a decoding module incorporated in the device proposed by the invention, shown in a specific embodiment.

In the particular embodiment illustrated in FIG. 5, the module 24 for decoding the sound signals has a module 42 for computing, for each loudspeaker signal $z_j(n)$ from the remote room considered, the sixth attenuation factor $G_{HP}(j,n)$ defined above on the basis of cumulative distribution functions calculated for each transmitted signal $y_k(n)$. These cumulative distribution functions can be supplied by the module 26 which computes cumulative distribution functions as illustrated in FIG. 4.

A module 44 for adjusting each sixth attenuation factor $G_{HP}(j,n)$ is connected to the output of the module 42. At its output, it supplies the weighting factors $\square_j(n)$ defined by formula (7) given above.

What is claimed is:

1. A method of reducing acoustic echo and adapting sound to space, in a system for digitally transmitting sound signals on P transmission channels between a local site and at least one remote site, each having N microphones and M loudspeakers, N, M, P being integers, it being possible for the values of N and M to differ depending on the sites, whereby:

(a) a cumulative distribution function is computed for each microphone signal $x_i(n)$ from the local site, i being an integer ranging between 1 and N and n denoting the time rank of the samples, and a cumulative distribution function is computed for each loudspeaker signal $z_j(n)$ from the local site, j being an integer ranging between 1 and M; then, for every i, $1 \leq i \leq N$, (b) a first attenuation factor $G_{mic}(i,n)$ is computed for the microphone signal $x_i(n)$ from the local site on the basis of a ratio between the cumulative distribution functions obtained previously;

(c) the first attenuation factor $G_{mic}(i,n)$ is adjusted so as to obtain a second attenuation factor $G'_{mic}(i,n)$ defined as follows:

$$G'_{mic}(i,n) = S_1(G_{mic}(i,n))$$

where $S_1(G_{mic}(i,n)) = s$ if $G_{mic}(i,n) \leq s$,
$S_1(G_{mic}(i,n)) = G_{mic}(i,n)$ if $s < G_{mic}(i,n) < 1$ and
$S_1(G_{mic}(i,n)) = 1$ if $G_{mic}(i,n) \geq 1$,
s being a predetermined minimum threshold which is strictly less than 1;

(d) on the basis of the cumulative distribution functions of microphone and loudspeaker signals computed previously, it is determined whether the microphone signal $x_i(n)$ is an echo signal only or a signal coming solely from the local site in the case of a first situation or
if the microphone signal $x_i(n)$ contains components from the local site and other components from the remote site in the case of a second situation;

(e) a third attenuation factor $G''_{mic}(i,n)$ is computed which, in the first situation, is equal to the second attenuation factor $G'_{mic}(i,n)$ and in said second situation is equal to the second attenuation factor $G'_{mic}(i,n)$ but in which the minimum threshold s in the computation used to obtain it is increased by a predetermined value;

(f) a fourth attenuation factor $\Gamma(i,n)$ is computed on the basis of a ratio between the cumulative distribution functions of microphone signals;

(g) the fourth attenuation factor $\Gamma(i,n)$ is adjusted in order to obtain a fifth attenuation factor $\Gamma'(i,n)$ defined as follows:

$$\Gamma'(i,n) = S_2(\Gamma(i,n))$$

where $S_2(\Gamma(i,n)) = s'$ if $\Gamma(i,n) \leq s'$,
$S_2(\Gamma(i,n)) = \Gamma(i,n)$ if $s' < \Gamma(i,n) < 1$ and
$S_2(\Gamma(i,n)) = 1$ if $\Gamma(i,n) \geq 1$,
s' being a predetermined minimum threshold strictly less than 1;

(h) the product of the third and fifth attenuation factors $G''_{mic}(i,n)$ and $\Gamma'(i,n)$ obtained previously is computed so as to obtain a global attenuation factor $G^*_{mic}(i,n)$ defined by:

$$G^*_{mic}(i,n) = G''_{mic}(i,n) \cdot \Gamma'(i,n);$$

(i) the global attenuation factor $G^*_{mic}(i,n)$ is adjusted so as to obtain a weighting factor $\beta_i(n)$ defined as follows:

$$\beta_i(n) = S_4(G^*_{mic}(i,n))$$

where $S_4(G^*_{mic}(i,n)) = s''$ if $G^*_{mic}(i,n) \leq s''$ and
$S_4(G^*_{mic}(i,n)) = G^*_{mic}(i,n)$ if $s'' < G^*_{mic}(i,n) \leq 1$,
s'' being a predetermined minimum threshold strictly less than 1;

(j) a signal $y_k(n)$ is transmitted on each transmission channel, k being an integer between 1 and P, in the form of a linear combination of the weighted microphone signals $x_i(n)$, defined as follows:

$$y_k(n) = \sum_{i=1}^{N} \alpha_{k,i}(n) \cdot \beta_i(n) \cdot x_i(n)$$

where $\alpha_{k,i}(n)$ denotes the predetermined real coding coefficients and $\beta_i(n)$ denotes the weighting factors obtained previously; then, for every integer j, $1 \leq j \leq M$:

(k) a sixth attenuation factor $G_{HP}(j,n)$ is computed for the loudspeaker signal $z_j(n)$ from the remote site on the basis of cumulative distribution functions calculated for each transmitted signal $y_k(n)$ from the local site;

(l) the sixth attenuation factor $G_{HP}(j,n)$ is adjusted so as to obtain a weighting factor $\lambda_j(n)$ defined as follows:

$$\lambda_j(n) = S_3(G_{HP}(j,n))$$

where $S_3(G_{HP}(j,n)) = s^*$ if $G_{HP}(j,n) \leq s^*$,
$S_3(G_{HP}(j,n)) = (G_{HP}(j,n))$ if $s^* < G_{HP}(j,n) < 1$ and
$S_3(G_{HP}(j,n)) = 1$ if $G_{HP}(j,n) \geq 1$,
s* being a predetermined minimum threshold strictly less than 1;

(m) the loudspeaker signal $z_j(n)$ of the remote site is determined on the basis of a linear combination of the weighted transmitted signals $y_k(n)$, defined as follows:

$$z_j(n) = \lambda_j(n) \cdot \sum_{k=1}^{P} \gamma_{j,k}(n) \cdot y_k(n)$$

where $\gamma_{j,k}(n)$ denotes the predetermined real decoding coefficients and where $\lambda_j(n)$ denotes the weighting factors obtained previously; and (n) the loudspeaker signal $z_j(n)$ thus obtained is emitted on the j th loudspeaker of the remote site.

2. A method according to claim 1, in which at step (a), the cumulative distribution function chosen for the microphone signals $x_i(n)$ and the loudspeaker signals $z_j(n)$ is the energy of these signals and, at step (b), the first attenuation factor $G_{mic}(i,n)$ for each microphone signal $x_i(n)$ is computed on the basis of the following formula:

$$G_{mic}(i,n) = \frac{Cum_2(x_i(n))}{C \cdot \sum_{j=1}^{M} Cum_2(z_j(n))}$$

where $Cum_2(.)$ denotes the energy and where C is a predetermined real constant strictly greater than 1.

3. A method according to claim 1, in which, at step (a), the cumulative distribution function chosen for the microphone signals $x_i(n)$ is the energy of these signals and, at step (f), the fourth attenuation factor $\Gamma(i,n)$ is computed for each microphone signal $x_i(n)$ on the basis of the following formula:

$$\Gamma(i,n) = \frac{(Cum_2(x_i(n)))^{N-1}}{\prod_{\substack{q=1 \\ q \neq i}}^{N} Cum_2(x_q(n))}$$

where $Cum_2(.)$ denotes the energy and where q is an integer.

4. A method according to claim 1, in which the products of $\gamma_{j,k}(n).\lambda_j(n)$, $1 \leq j \leq M$, $1 \leq k \leq P$, are also transmitted on the P channels at the same rate as the sound signals.

5. A method according to claim 1, in which the signals to be transmitted $y_k(n)$ are also broadcast on the local site by means of the local loudspeakers, in addition to the signals received from the remote site and at a lower level than these latter.

6. A device for reducing acoustic echo and adapting sound to space, in a system for digitally transmitting sound signals on P transmission channels between a local site and at least one remote site, each having N microphones and M loudspeakers, N, M, P being integers, it being possible for the values of N and M to differ depending on the sites, said device comprising:

means for encoding sound signals, receiving at its input N digital signals $x_i(n)$ respectively originating from the N microphones of the local site, where i is an integer between 1 and N and n is an integer which denotes the time rank of the samples, said means supply at its output P digital signals $y_k(n)$, where k is an integer ranging between 1 and P, defined by the following formula:

$$y_k(n) = \sum_{i=1}^{N} \alpha_{k,i}(n) \cdot \beta_i(n) \cdot x_i(n)$$

where $\alpha_{k,i}(n)$ denotes the predetermined real coding coefficients and where $\beta_i(n)$ denotes the weighting factors which depend on cumulative distribution functions of the signals received by the microphones of the local site and cumulative distribution functions of the signals emitted by the loudspeakers of the local site, the P signals $y_k(n)$ being transmitted respectively on the P transmission channels between the local site and the remote site; and means for decoding the sound signals, receiving at its input the P signals $y_k(n)$ and supplying M digital signals $z_j(n)$ at its output to be emitted respectively by the M loudspeakers of each site, where j is an integer between 1 and M, defined by the following formula:

$$z_j(n) = \lambda_j(n) \cdot \sum_{k=1}^{P} \gamma_{j,k}(n) \cdot y_k(n)$$

where $\gamma_{j,k}(n)$ denotes the predetermined real decoding coefficients and where $\lambda_j(n)$ denotes the weighting factors which depend on the signals $Y_k(n)$.

7. A device according to claim 6, wherein said means for coding sound signals comprise:

means for computing a cumulative distribution function for each microphone signal $x_i(n)$ of the local site and a cumulative distribution function for each loudspeaker $z_j(n)$ of the local site;

means for computing a first attenuation factor $G_{mic}(i,n)$ for each microphone signal $x_i(n)$ of the local site on the basis of a ratio between cumulative distribution functions supplied by said means for computing cumulative distribution functions;

means for adjusting each first attenuation factor $G_{mic}(i,n)$ so as to obtain, for every i, $1 \leq i \leq N$, a second attenuation factor $G'_{mic}(i,n)$ defined as follows:

$$G'_{mic}(i,n) = S_1(G_{mic}(i,n))$$

where $S_1(G_{mic}(i,n)) = s$ if $G'_{mic}(i,n) \leq s$,
$S_1(G_{mic}(i,n)) = G_{mic}(i,n)$ if $s < G_{mic}(i,n) < 1$ and
$S_1(G_{mic}(i,n)) = 1$ if $G_{mic}(i,n) \geq 1$,
s being a predetermined minimum threshold which is strictly less than 1;

means for determining, for each microphone signal $x_i(n)$, on the basis of cumulative distribution functions of microphone and loudspeaker signals supplied by said means for computing cumulative distribution functions, whether this microphone signal $x_i(n)$ is a single echo signal or a signal coming from the local site only, in a first situation, or whether this microphone signal $x_i(n)$ contains components from the local site and other components from the remote site, in a second situation;

means for computing, for every i, $1 \leq i \leq N$, a third attenuation factor $G''_{mic}(i,n)$, which in said first situation is equal to the second attenuation factor $G'_{mic}(i,n)$ and in said second situation is equal to the second attenuation factor $G'_{mic}(i,n)$ but in which the minimum threshold s in the computation used to obtain it is increased by a predetermined value;

means for computing, for every i, $1 \leq i \leq N$, a fourth attenuation factor $\Gamma(i,n)$ on the basis of a ratio between the cumulative distribution functions of microphone signals;

means for adjusting each fourth attenuation factor $\Gamma(i,n)$ in order to obtain a fifth attenuation factor $\Gamma'(i,n)$ defined as follows:

$$\Gamma'(i,n) = S_2(\Gamma(i,n))$$

where $S_2(\Gamma(i,n)) = s'$ if $\Gamma(i,n) \leq s'$,
$S_2(\Gamma(i,n)) = \Gamma(i,n)$ if $s' < \Gamma(i,n) < 1$ and
$S_2(\Gamma(i,n)) = 1$ if $\Gamma(i,n) \geq 1$,
s' being a predetermined minimum threshold strictly less than 1; and means for computing and adjusting, for each i, $1 \leq i \leq N$, the product of the third and fifth attenuation factors $G''_{mic}(i,n)$ and $\Gamma'''(i,n)$ obtained previously, so as to obtain said weighting factors $\beta_i(n)$ defined as follows:

$$\beta_i(n)=S_4(G^*_{mic}(i,n))$$

where $(G^*_{mic}(i,n))=(G''_{mic}(i,n))\cdot\Gamma'(i,n)$
where $S_4(G^*_{mic}(i,n))=s''$ if $G^*_{mic}(i,n)\leq s''$ and,
$S_4(G^*_{mic}(i,n))=G^*_{mic}(i,n)$ if $s''\leq G^*_{mic}(i,n)\leq 1$,
s" being a predetermined minimum threshold strictly less than 1.

8. A device according to claim 6, wherein said means for decoding the sound signal comprises:

means for computing, for each loudspeaker signal $z_j(n)$, a sixth attentuation factor $G_{HP}(j,n)$ on the basis of cumulative distribution functions calculated for each signal $y_k(n)$; and means for adjusting each sixth attenuation factor $G_{HP}(j,n)$ so as to obtain said weighting factors $\lambda_j(n)$ defined as follows:

$$\lambda_j(n)=S_3(G_{HP}(j,n))$$

where $S_3(G_{HP}(j,n))=s^*$ if $G_{HP}(j,n)\leq s^*$,
$S_3(G_{HP}(j,n))=(G_{HP}(j,n))$ if $s^*<G_{HP}(j,n)<1$ and
$S_3(G_{HP}(j,n))=1$ if $(G_{HP}(j,n)\geq 1$,
s* being a predetermined minimum threshold strictly less than 1.

9. A device according to claim 7, wherein said means for computing each first attenuation factor $G_{mic}(i,n)$ supplies at its output:

$$G_{mic}(i,n) = \frac{Cum_2(x_i(n))}{C\cdot\sum_{j=1}^{M} Cum_2(z_j(n))}$$

where $Cum_2(.)$ denotes the cumulative distribution function which represents the energy and where C is a predetermined real constant strictly greater than 1.

10. A device according to claim 7, wherein said means for computing each fourth attenuation factor $\Gamma(i,n)$ supplies at its output:

$$\Gamma(i,n) = \frac{(Cum_2(x_i(n)))^{N-1}}{\prod_{\substack{q=1\\q\neq i}}^{N} Cum_2(x_q(n))}$$

where $Cum_2(.)$ denotes the cumulative distribution function representing the energy and where q is an integer.

* * * * *